United States Patent [19]

Linnersten

[11] Patent Number: 5,129,929
[45] Date of Patent: Jul. 14, 1992

[54] SORBENT FILTRATION DEVICE

[75] Inventor: Staffan B. Linnersten, New Port Richey, Fla.

[73] Assignee: Pall Corporation, Glen Cover, N.Y.

[21] Appl. No.: 629,010

[22] Filed: Dec. 18, 1990

Related U.S. Application Data

[63] Continuation of Ser. No. 357,259, May 26, 1989, abandoned.

[51] Int. Cl.⁵ .............................................. B01D 50/00
[52] U.S. Cl. ..................................... 55/274; 55/316; 55/387; 55/521; 55/524
[58] Field of Search ................. 55/274, 275, 387, 521, 55/316, 524; 210/489, 493.1, 502.1, 503, 504, 506

[56] References Cited

U.S. PATENT DOCUMENTS

| | | |
|---|---|---|
| 1,802,941 | 4/1931 | Drager . |
| 1,843,446 | 2/1932 | Drager .................... 55/387 |
| 2,038,071 | 4/1936 | Wilhelm .................. 183/4 |
| 3,507,621 | 4/1970 | Goodman et al. ........... 23/252 |
| 3,800,515 | 4/1974 | Asker et al. .............. 55/387 |
| 3,807,148 | 4/1974 | Fike et al. ............... 55/385 |
| 4,178,161 | 12/1979 | Rudner et al. ............ 55/524 |
| 4,418,662 | 12/1983 | Engler et al. ............. 55/387 |
| 4,514,197 | 4/1985 | Armbruster ............... 55/387 |
| 4,612,026 | 9/1986 | Pollara et al. ............ 55/274 |
| 4,749,392 | 6/1988 | Aoki et al. ............... 55/387 |
| 4,769,053 | 9/1988 | Fischer, Jr. .............. 55/389 |
| 4,925,468 | 5/1990 | Kishi et al. .............. 55/467 |

FOREIGN PATENT DOCUMENTS 1466065 of 1966 France .
1275845 of 1969 United Kingdom .

*Primary Examiner*—Ivars Cintins
*Attorney, Agent, or Firm*—Leydig, Voit & Mayer

[57] ABSTRACT

A sorbent filter pad for removing undesirable gases from an air flow is described. The pad has two major surfaces with one formed into a series of parallel ridges such that the thickness of the pad varies along a direction perpendicular to the ridges. In a preferred combination the sorbent pad is combined with a pleated particulate filter element such that the ridges occupy the pleat hollows on the downstream side of the particulate filter.

10 Claims, 3 Drawing Sheets

SORBENT FILTRATION DEVICE

This application is a continuation of application Ser. No. 07/357,259 filed May 26, 1989, now abandoned.

TECHNICAL FIELD

This invention relates to air filtration devices and specifically to those whose objective is to remove certain sorbable gaseous components.

BACKGROUND OF THE INVENTION

It is well known that, in any space having a recycled air system, it is highly desirable to filter the recycled air to remove particulate matter. However, some air contaminants are gaseous in nature and are not easily removable by filters that rely on interception or entrapment of particulates carried by the air. Some of these gases may be toxic, noxious, unpleasant to smell, or they may be merely undesirable in a specific situation such as water vapor in a humid environment or an elevated carbon dioxide concentration in recirculated air, or otherwise undesirable (such gases being referred to generally as "undesirable" in what follows) and a means for their removal in such a system is highly desirable. The problem is particularly acute in airplanes, or other closed environments such as submarines, fall-out shelters, and space craft, where the recycling of air containing undesirable odors is not calculated to produce contented occupants. It is also a significant problem if minor amounts of toxic or irritant gases are present, or being liberated, as in a chemical warfare situation or an environment accidentally contaminated with hazardous gases. Recycling air that is merely cleaned of particulate contamination will increase the exposure to such gases and, therefore, increase the risk of adverse consequences.

It is known that some materials are highly effective at sorbing gases and it has been proposed that filtered air also be passed through a pad of one of these materials before completing the recycle operation. This is a satisfactory expedient up to a point, that is, there are no problems until the sorbent material is saturated and gas "breakthrough" occurs. From a clean flow, the change to a flow containing undesirable gases is swift and dramatic because the air flow is, by design, equal through all parts of the pad so far as can be arranged. Thus, breakthrough occurs at all points essentially simultaneously. Since it is not easy to predict or measure the approach of breakthrough due to the unknown challenge encountered by the filter, it is necessary to have excessively frequent pad changes or risk breakthrough occurring at an inconvenient time such as, (in a cabin-air situation), the beginning of a long non-stop transpacific flight.

Another problem that is associated with sorption filter pads is that they frequently cause an undesirably high pressure drop across the filter pad such that high power rating air circulation equipment may be needed with the associated problems, not only of power consumption, but also of size and noise.

SUMMARY OF THE INVENTION

A sorbent pad has now been designed that is capable of minimizing these problems by ensuring that breakthrough, when it occurs, is a gradual event and combines high efficiency with only a modest pressure drop across the pad.

In addition, it is an objective of this invention to provide a pad that will cooperate with certain preferred particulate filter devices to produce a compact and effective combined filtration and sorbent device that can readily meet the most stringent space limitations of modern airplane design.

The above objectives are obtained by a pad of a solid sorbent material for sorbing undesirable gases, said pad having two major surfaces, one of which is formed into a plurality of parallel ridges such that the pad thickness varies in the direction perpendicular to the ridges. It is found that with a pad of this construction, breakthrough occurs at the thinner parts (i.e., between the ridges), first of all and then gradually over the rest of the pad. This is because air passing through the portion of the pad corresponding to ridges has to pass through a greater thickness of sorbent material and therefore saturation will be reached much later. Any undesirable gas that breaks through is diluted to acceptable proportions and upon recycling will be, in part at least, sorbed by passage through other (non-exhausted) parts of the pad. The result is a significantly extended service life for the sorbent pad of the invention.

The preferred pad has a planar major surface opposite to the ridged surface but this is not essential and any configuration that preserves the thickness variation described above can be used. For example, both surfaces could be ridged providing the thickness variation feature is not eliminated. As a result of the varying thickness of the pad some air, passing through the thinnest portions, will move quite quickly while another portion, passing through the maximum thickness, will encounter the maximum hold-up time. As a result, the perceived pressure drop across the pad is somewhere between the extremes represented by passage through the thickest and thinnest sections of the pad.

The sorbent material that is often used is sorbent carbon but other sorbent materials that have been shown to be effective in such applications include silica gel, activated alumina, natural zeolites, synthetic molecular sieves, and sorbent clays.

In a particularly preferred embodiment the sorbent pad is combined with a particulate filter to produce a sorbent particulate filter device. The specific particulate filters with which the present invention finds greatest compatibility are those in which the particulate filter has a pleated configuration. In this event, the ridges on the sorbent pad can be of such a size and number as to fit conveniently into the hollows of the pleats on one side of the particulate filter device. This is most conveniently the downstream face of the particulate filter device. In this manner, the pad occupies otherwise wasted space and this space saving characteristic is an important design factor favoring such structures. Preferably, the sorbent pad occupies at least about 50% and most preferably at least about 70% of the volume of the hollows in one side of the pleated filter device.

In a further preferred feature of the present invention, the particulate filter is first formed into a plurality of micropleats and then is formed into a plurality of macropleats with the axes of all pleats in essentially parallel directions. Particulate filters of this type provide a very large surface area in a relatively compact space. Placing the sorbent pad material in close proximity to the particulate filter as described above produces even more space saving and is a highly attractive feature.

As indicated above, the sorbent can be made of any suitable material such as activated carbon and finely divided alumina or silica. The sorbent may often be impregnated with an oxidizing agent such as permanganate or a caustic alkali such as sodium hydroxide to give it specific effectiveness against one gas or group of gases. The sorbent can be tailored in this way to suit the environment in which it is to be used.

Sorption is known to be a surface phenomenon so whatever the material chosen it is important that it have a very large surface area exposed to the gas and at the same time the ability to retain gas or change it into innocuous components while it is in contact with the sorbent. Any material having these characteristics can be used as the sorbent material in the sorption pad.

Since the sorbent pad is often made up of finely divided material it is usually necessary in such embodiments to provide containment means for the particulate material. In a preferred embodiment, this means comprises a fine metal mesh covered with a non-woven spun-bonded web of nylon filaments. The purpose of this means, however, is merely to contain the sorbent material without giving rise to a significant increase in the pressure drop across the filter. Therefore, any means securing this end can be substituted.

In some situations it is possible to provide the sorbent means as a consolidated self-supporting structure with the sorbent particles bound to one another or supported in a matrix structure. Such expedients are often acceptable embodiments of the essential invention.

As will be appreciated, if the resistance to air passage is lowest in the areas adjacent to the thinnest portion of the sorption pad, then this is where the dirt will begin to build up on the particulate filter. As this continues, filtration through this segment of the filter will become increasingly difficult and passage through less obstructed portions of the filter, that is, through the sloping sides of the pleats, will be preferred. In this way, breakthrough at the thinnest portions will be delayed and when breakthrough eventually occurs, the rate of increase of the concentration of undesirable gases in the filtered air will be lowered. In some situations, the increased pressure drop may not be desirable, thus, a small space can be created between the downstream side of the particulate filter and the upstream side of the sorbent pad.

It is often useful to be able to follow the depletion of the sorbent in the bed and this can be done by affixing to a downstream face of the sorbent bed an indicator providing preferably visual signals that the bed at that point is depleted. Thus, if a suitable indicator band spanning the separation between two adjacent thinner parts of the bed is provided, and the band changes color on breakthrough, it is possible to follow the depletion by observing the color-changed zones at either end expanding to meet in the middle when depletion is total.

DESCRIPTION OF THE DRAWINGS

The invention is now further described with specific reference to the drawings in which.

DESCRIPTION OF AN EMBODIMENT OF THE INVENTION

Figure 1:
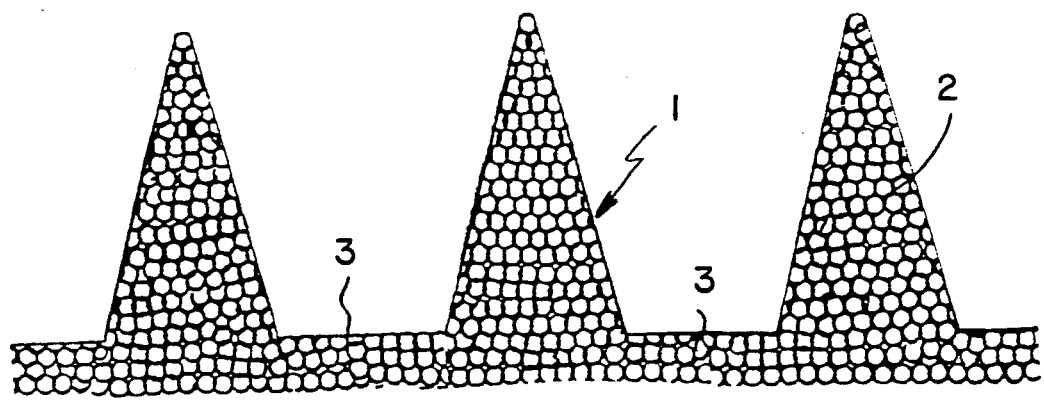
FIG. 1 is a cross-section of a sorbent pad according to the invention.

A sorbent pad according to the invention is illustrated in cross-section in FIG. 1 in which the pad 1 comprises a series of parallel ridges 2 separated by segments with parallel upper faces 3. It is this portion 3 through which breakthrough occurs first in normal use and which corresponds to zone A in FIG. 4.

Figure 2:
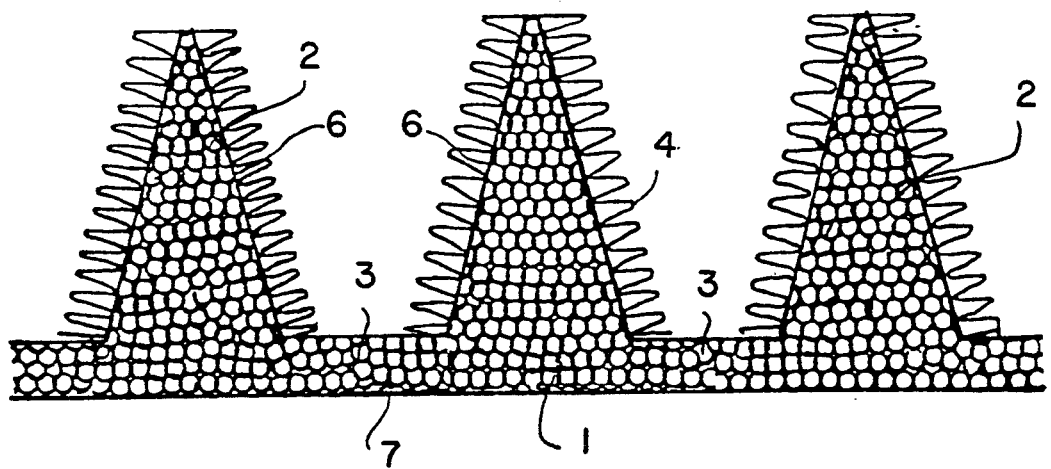
FIG. 2 is a cross-section of a sorbent pad in collaboration with a preferred particulate filter device.
Figure 4:
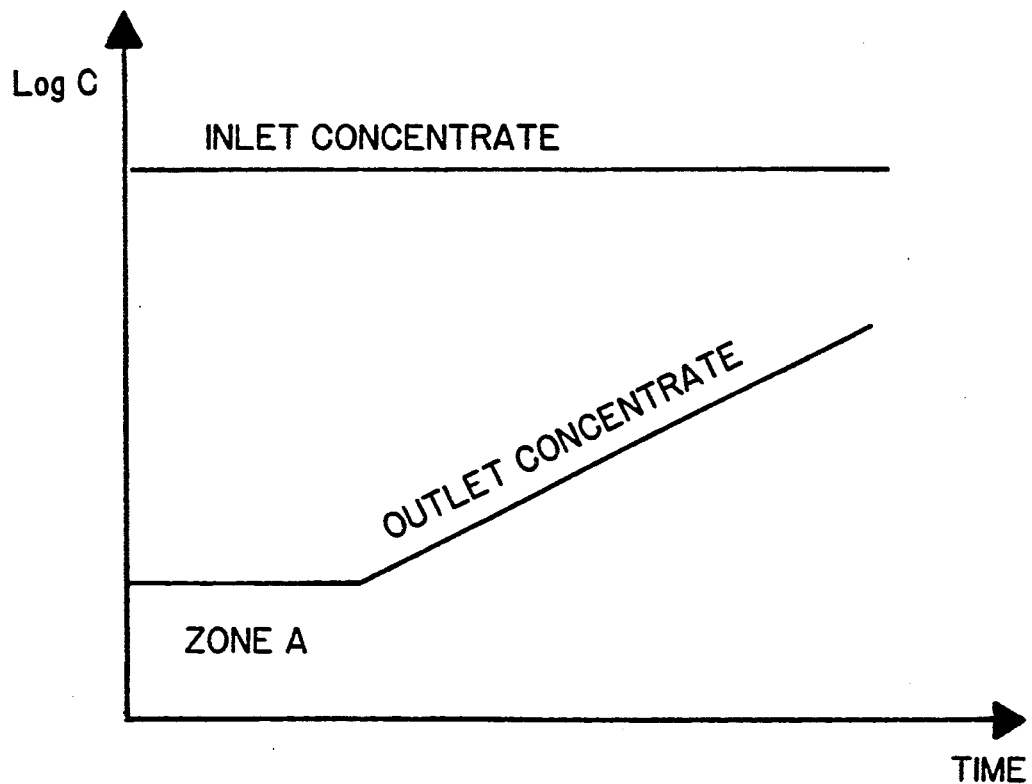
FIG. 4 is a graph of the log of the concentration of undesirable gases in the air plotted against time in a typical recycled air system.

In FIG. 2 a sorbent pad such as described in FIG. 1 is combined with a particulate filter of a preferred design such as is described in U.S. application Ser. No. 07/310,531 filed Feb. 15, 1989 (which is incorporated herein by reference). In this preferred construction, a particulate filter in which the filtration medium is formed into a plurality of micropleats and then subsequently formed into a series of macropleats with the axes of all pleats being essentially parallel, is so located that the ridges of the sorbent pad fit into the spaces between the pleats of the particulate filter. In use, air passes through the particulate filter and then through the sorbent pad. As will be appreciated, the preferred route will be for the air to pass between the pleats of the particulate filter and through the portion of the sorbent pad between the ridges indicated as zone A in the graph (FIG. 4). As a result of this, particulate filtered material will build up at the roots of the pleats and make passage through this portion more difficult.

At this time, the preferred route would be through the sides of the pleats and thence through the ridges of the sorbent pad. In this way, breakthrough of the undesirable gases through zone A will be delayed and the consequences of breakthrough when they occur will be significantly less dramatic.

In FIG. 2, the filter comprises the particulate filter device 4 and the sorbent pad 1 with parallel ridges 2 retained on both sides between a wire mesh layer 6 and a nonwoven spun-bonded nylon fiber layer 7. The zone between the ridges, 3, is referred to as zone A on FIG. 4.

In the operation of the device air contacts first of all the particulate filter and having passed through this component contacts the sorbent pad.

Figure 3:
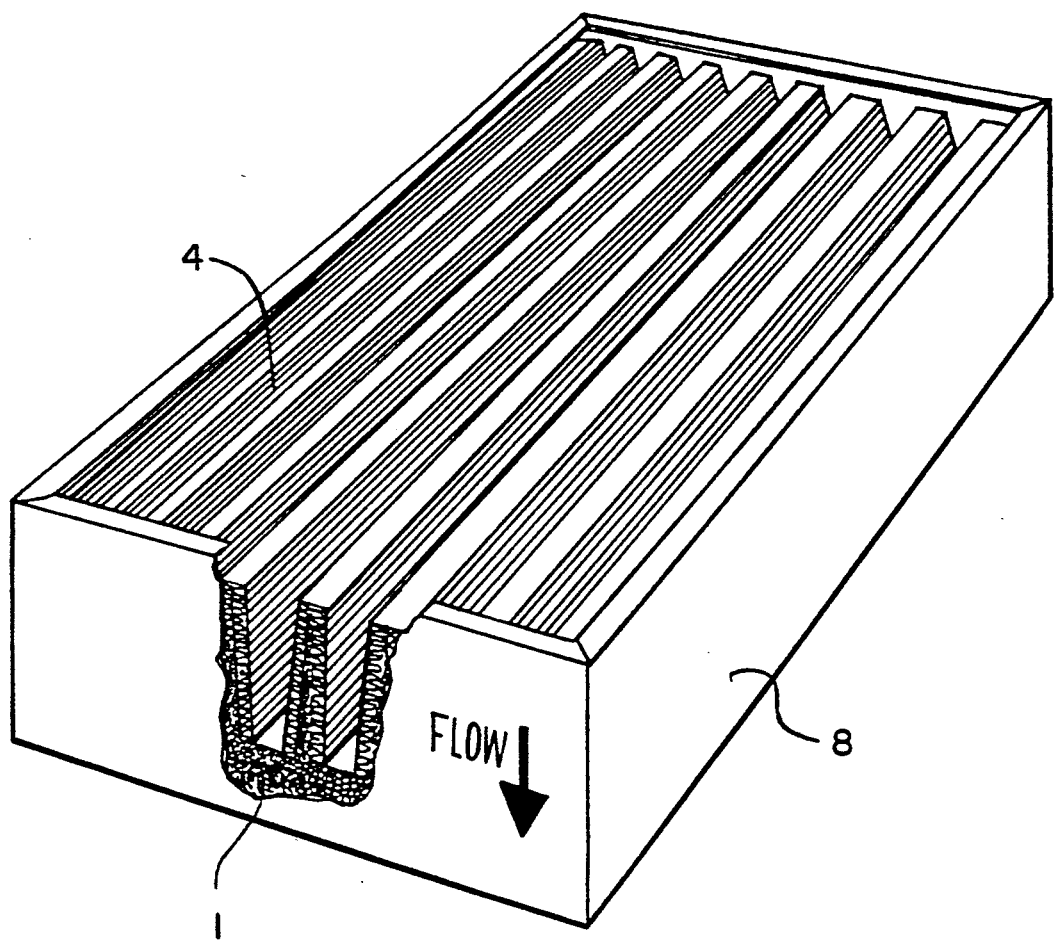
FIG. 3 is a cutaway perspective view of a cabin air filter incorporating the sorbent pad of the invention and a preferred form of particulate filter.

FIG. 3 illustrates a combined particulate/undesirable gas removal device according to the invention. In this device, the general construction illustrated in FIG. 2 is contained in a housing 8.

Two filters having the general construction shown in FIG. 3 were constructed. These were tested for the pressure drop across the filter, when clean, at an air flow of 900 cubic feet per minute. The ratio of the components of the pressure drop (due to sorbent G and due to the particulate filter P) was measured for each along with the total weight of sorbent in the sorbent pad and the unit weight when clean and dry. The results are illustrated in Table I.

The sorbent pad can be bonded to the particulate filter but it is preferred that the positional relationship between the two be maintained by locating them in the same housing, for example, as shown in FIG. 3. The edges of the sorbent can be sealed in the housing in much the same way as the particulate filter, for example, by the use of a potting compound. It is often more convenient, however, to use a rubber gasket to seal the edges as this permits separate removal and replacement of either or both components.

TABLE I

| Parameter | A | B |
| --- | --- | --- |
| Clean pressure drop at 900 CFM | 1.4" WC | .7" WC |
| $\frac{G}{P}$ | 1.85 | .72 |
| Sorbent weight | 28 lbs | 19 lbs |
| Unit weight clean and dry | 44 lbs | 35 lbs |

WC—water column $\frac{G}{P}$ —the ratio of pressure drop resulting from passage through the sorbent pad to the pressure drop resulting from passage through the particulate filter While the invention has been illustrated by reference to the above embodiment, this should not be seen as implying any essential limitation to the scope of the invention which is claimed below.

The sorbent pads of the invention can be used not only in recycled air systems, such as are described above, but also in filtering undesirable gases from air entering an environment for the first time. This application would include filters to protect against chemical warfare gases and filters for hazardous gas exposure suits for work or rescue situations and the like.

I claim:

1. A sorbent filter structure comprising a pleated particulate filter element, having essentially parallel pleat axes, and a sorbent pad in the form of a flat base for sorbing undesirable gases, said pad having two major surfaces, the first being planar and the second having formed on it a plurality of spaced parallel ridges, said pad being further constructed and positioned such that the parallel ridges fit into the hollows of the pleats on one face of the particulate filter.

2. A sorbent filter structure according to claim 1 in which the pad is made from a sorbent form of carbon, silica, or alumina.

3. A sorbent filter structure according to claim 1 in which the pad of sorbent material is so constructed as to occupy at least 70 percent of the volume of the hollows in said pleats.

4. A sorbent filter structure according to claim 1 having upstream and downstream sides, in which the sorbent pad is located on the downstream side of the particulate filter.

5. A sorbent filter structure according to claim 1 in which the particulate filter element is first formed into micropleats and then into macropleats, the axes of all pleats being essentially parallel.

6. A sorbent filter structure according to claim 1 in which the upstream surface of the sorbent pad is provided with parallel ridges and the downstream surface is provided with an indicator means over at least a portion of said downstream surface, said indicator means being adapted to change color on contact with an undesirable gas.

7. A sorbent filter structure according to claim 1 in which the sorbent pad also contains a substance effective to chemically change an undesirable gas into an innocuous material.

8. A sorbent filter structure comprising a pleated particulate filter element having micropleats and macropleats, the axes of all pleats being essentially parallel, and a sorbent pad for sorbing undesirable gases, said pad having two major surfaces, the first being planar and the second having formed on it a plurality of parallel ridges, said pad being further constructed and positioned such that the parallel ridges fit into the hollows of the pleats on one face of the particulate filter.

9. A sorbent filter structure according to claim 8 in which the upstream surface of the sorbent pad is provided with parallel ridges and the downstream surface is provided with an indicator means over at least a portion of said downstream surface, said indicator means being adapted to change color on contact with an undesirable gas.

10. A sorbent filter structure according to claim 8 in which the sorbent pad also contains a substance effective to chemically change an undesirable gas into an innocuous material.

* * * * *